United States Patent
Matsuhira

(10) Patent No.: US 7,836,154 B2
(45) Date of Patent: Nov. 16, 2010

(54) ROUTER FOR AUTOMATICALLY GENERATING IP ADDRESS

(75) Inventor: Naoki Matsuhira, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 825 days.

(21) Appl. No.: 10/763,943

(22) Filed: Jan. 23, 2004

(65) Prior Publication Data

US 2004/0205235 A1    Oct. 14, 2004

(51) Int. Cl.
- *G06F 15/177* (2006.01)
- *G06F 15/16* (2006.01)
- *H04L 12/66* (2006.01)
- *H04L 12/56* (2006.01)
- *H04J 3/16* (2006.01)

(52) U.S. Cl. ............... 709/220; 709/245; 370/352; 370/389; 370/401; 370/466

(58) Field of Classification Search ............ 709/220
See application file for complete search history.

(56) References Cited

U.S. PATENT DOCUMENTS

| | | | | |
|---|---|---|---|---|
| 2004/0024860 A1* | 2/2004 | Sato et al. | ............... | 709/223 |
| 2004/0071148 A1* | 4/2004 | Ozaki et al. | ............... | 370/401 |
| 2004/0083306 A1* | 4/2004 | Gloe | ............... | 709/245 |
| 2005/0021603 A1* | 1/2005 | Yokomitsu et al. | ......... | 709/203 |
| 2005/0100008 A1* | 5/2005 | Miyata et al. | ............ | 370/389 |

FOREIGN PATENT DOCUMENTS

JP    2002-009808    1/2002

* cited by examiner

*Primary Examiner*—George C Neurauter, Jr.
*Assistant Examiner*—Kishin G Belani
(74) *Attorney, Agent, or Firm*—Katten Muchin Rosenman LLP

(57) ABSTRACT

A router for automatically generating an IP address including a position identifier portion and an interface identifier portion includes a routing table for storing each position identifier portion and information on an output route for the position identifier portion, a determining unit for determining for each of a plurality of ports whether a position identifier portion is assigned to a network to which the port is connected, a position identifier portion generating unit for referring to the routing table and generating a position identifier portion different from the position identifier portion registered in the routing table for a port not assigned a position identifier portion, and a routing unit for receiving routing information including a position identifier portion according to a dynamic routing protocol and registering the routing information in the routing table.

2 Claims, 9 Drawing Sheets

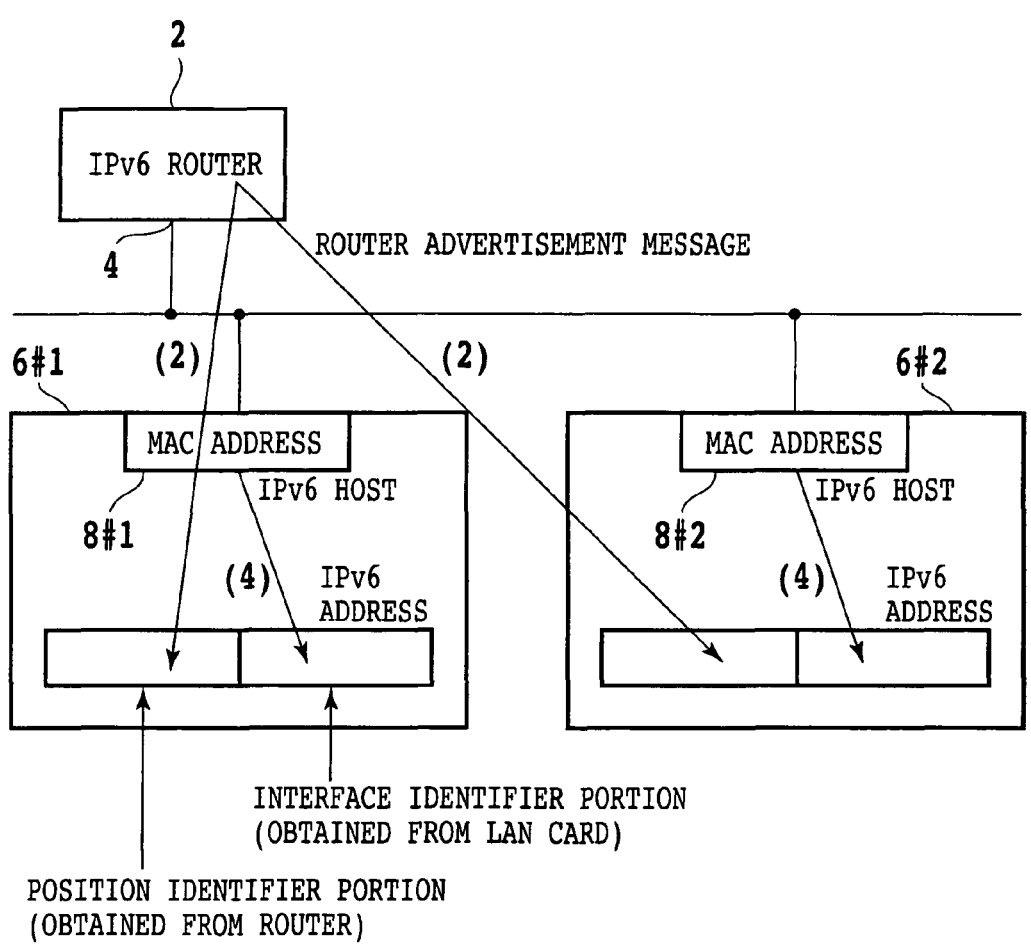

US 7,836,154 B2

ROUTER FOR AUTOMATICALLY GENERATING IP ADDRESS

BACKGROUND OF THE INVENTION

1. Field of the Invention

The present invention relates to an IPv6 compatible router for forming a network of IPv6, which is a new basic protocol for the Internet.

2. Description of the Related Art

The Internet is a network interconnected worldwide, and has been spreading rapidly. IPv6 is a technology for drastically solving the shortage of addresses on the Internet that has thus spread explosively, and IPv6 is expected to be spread widely. There are two kinds of IPv6 addresses: aggregatable unicast global addresses and site-local addresses. Aggregatable unicast global addresses are used in connecting to the Internet, whereas site-local addresses can be used freely within a site.

FIG. 8 is a diagram showing a format of an aggregatable unicast global address. As shown in FIG. 8, an IPv6 address comprises a 64-bit position identifier (prefix) and a 64-bit interface identifier (interface ID). The position identifier comprises a 3-bit format prefix (FP), a 13-bit top-level aggregation identifier (TLA ID), an 8-bit reserved field for future use (RES), a 24-bit next-level aggregation identifier (NLA ID), and a 16-bit site-level aggregation identifier (SLA ID). The interface ID is used to uniquely identify an interface on a link. The interface ID is required to be unique on the link. The interface ID generally uses a 32-bit MAC address of the host in a part of the field.

FIG. 9 is a diagram showing a format of a site-local address. The site-local address comprises a position identifier portion (prefix) composed of the most significant 48 bits set fixedly and a 16-bit subnet ID, and a 64-bit interface identifier portion (interface ID). The most significant 48 bits of an aggregatable unicast global address is assigned from a connected ISP or the like. A company or a household connected to the Internet uses the SLA field to construct a network within the company or the household. Conventional networks using IPv6 require distribution of unique IP addresses. Initial IPv4 networks for example required the trouble of manually determining IP addresses for host units and setting the IP addresses in the individual hosts. Thereafter DHCP (Dynamic Host Configuration Protocol) was developed as a protocol for assigning addresses to hosts, thus making it possible to construct an environment usable without manual setting of hosts.

DHCP is defined in RFC 2131, "Dynamic Host Configuration Protocol." Such a so-called Plug & Play technique, which eliminates setting by a user, is important for enabling a user unaccustomed to setting and the like to use an IP net easily, for example. IPv6 allows automatic generation of an IP address for a host according to a neighbor discovery protocol without a DHCP server, thus greatly improving usability thereof. According to the neighbor discovery protocol, a router advertises an IP address position identifier of the link to a host, and the host generates an IP address on the basis of the position identifier.

The IP address is defined in RFC 2373, "IP Version 6 Addressing Architecture," and RFC 2374, "An IPv6 Aggregatable Global Unicast Address Format." The neighbor discovery protocol is defined in RFC 2461, "Neighbor Discovery for IP Version 6 (IPv6)." The automatic address generation by the host is defined in RFC 2462, "IPv6 Stateless Address Autoconfiguration."

On the other hand, the router, which is another entity for forming an IP network, needs to be assigned a unique address. It is therefore necessary to design the address manually, as is conventional, and set the value in the router.

FIG. 10 is a diagram representing a method of automatically generating an address by a host. A 64-bit prefix of an IPv6 address is manually set to a port 4 of an IPv6 router 2. The most significant 48 bits of the prefix is assigned from an ISP or the like, and the SLA of the least significant 16 bits is designed by a network constructor such as an operator or the like. As indicated by (2), the IPv6 router 2 periodically advertises the 64-bit prefix of a network connected to the port 4 in a Router Advertisement message from the port 4 according to the neighbor discovery protocol.

Hosts 6#1 and 6#2 receive the Router Advertisement message, and thereby obtain the 64-bit prefix. As indicated by (4), the hosts 6#1 and 6#2 obtain a 64-bit interface identifier portion on the basis of a MAC address set in LAN cards 8#1 and 8#2. Then, the hosts 6#1 and 6#2 combine the prefix with the interface identifier portion, and thereby obtain a 128-bit IP address.

Thus, a company or a household connected to the Internet uses the SLA field to construct a network within the company or the household. Hence, although an assigned value may be used as it is as the most significant 48 bits, the SLA value needs to be assigned to each router such that the SLA value is unique in the internal network. A site-local address has the most significant 48 bits thereof set fixedly. The address in this format also requires a subnet ID field to be used and assigned to each router so as to be unique in the internal network.

However, conventional address design and assignment in a company or the like is currently performed by an organization that manages the network, and this work requires knowledge of IPv6. Therefore IPv6 networks are not introduced smoothly into households, companies and the like where a person with such knowledge is not very likely to be present.

SUMMARY OF THE INVENTION

It is accordingly an object of the present invention to provide a router that automatically determines an SLA value or a subnet ID value, which is required to be designed and set in a household or a company, and thus makes it possible to construct a network without setting.

In accordance with an aspect of the present invention, there is provided a router for automatically generating an IP address comprising a position identifier portion and an interface identifier portion, the router comprising: a routing table for storing each position identifier portion and information on an output route for the position identifier portion; a determining unit for determining for each of a plurality of ports whether a position identifier portion is assigned to a network to which the port is connected; a position identifier portion generating unit for referring to the routing table and generating a position identifier portion different from the position identifier portion registered in the routing table for a port not assigned a position identifier portion; and a routing unit for receiving routing information including a position identifier portion according to a dynamic routing protocol and registering the routing information in the routing table, and registering routing information including the position identifier portion generated by the position identifier portion generating unit in the routing table and notifying another router of the routing information.

Preferably, the position identifier portion generating unit generates the position identifier portion by generating a random number. Further, the position identifier portion generating unit generates the position identifier portion by incrementing a maximum position identifier portion registered in the routing table.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 10 is a diagram representing a conventional method of automatically generating an address by a host.

DETAILED DESCRIPTION OF THE PREFERRED EMBODIMENTS

Figure 1:
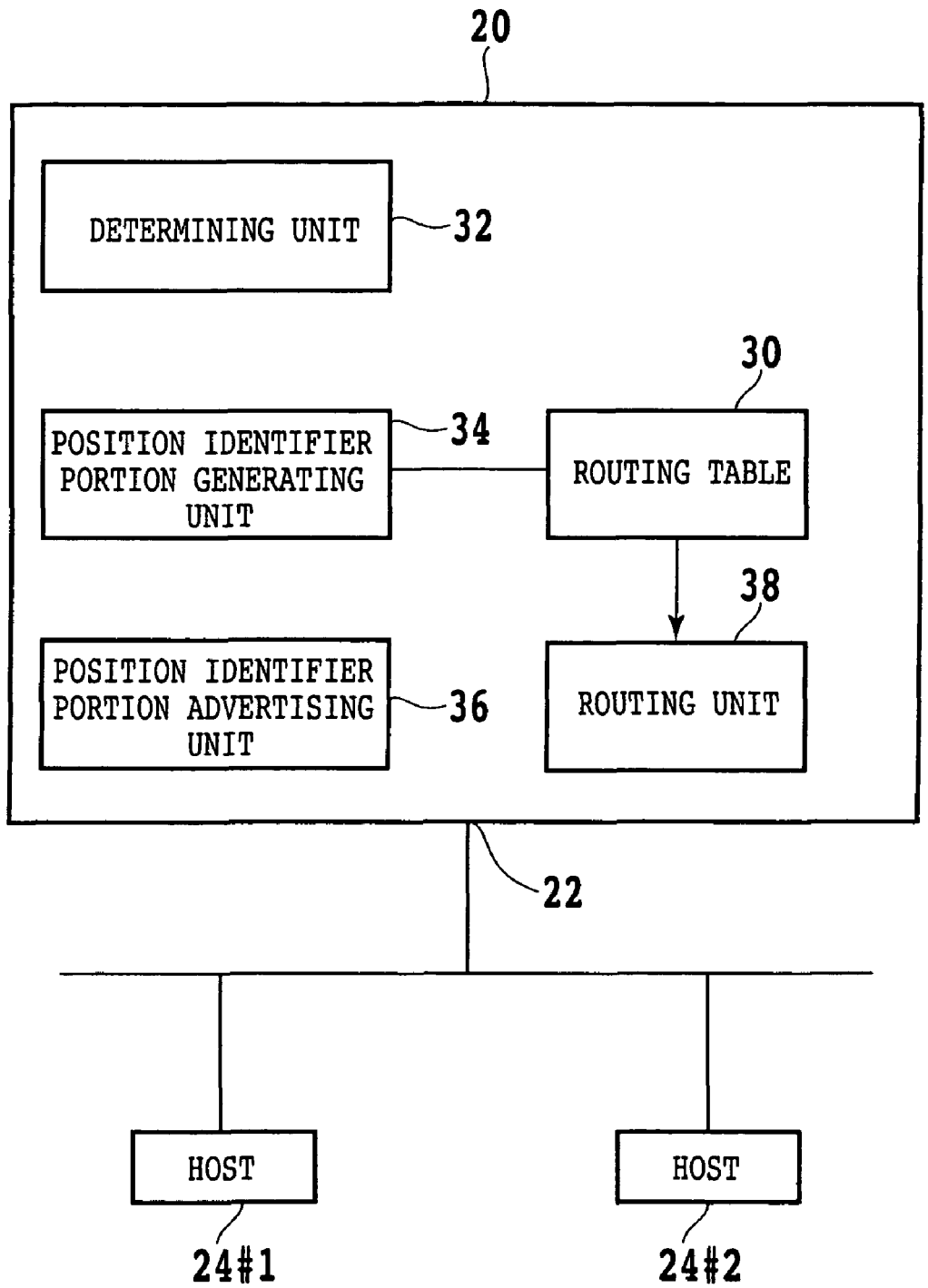
FIG. 1 is a diagram of assistance in explaining principles of the present invention.
Figure 2:
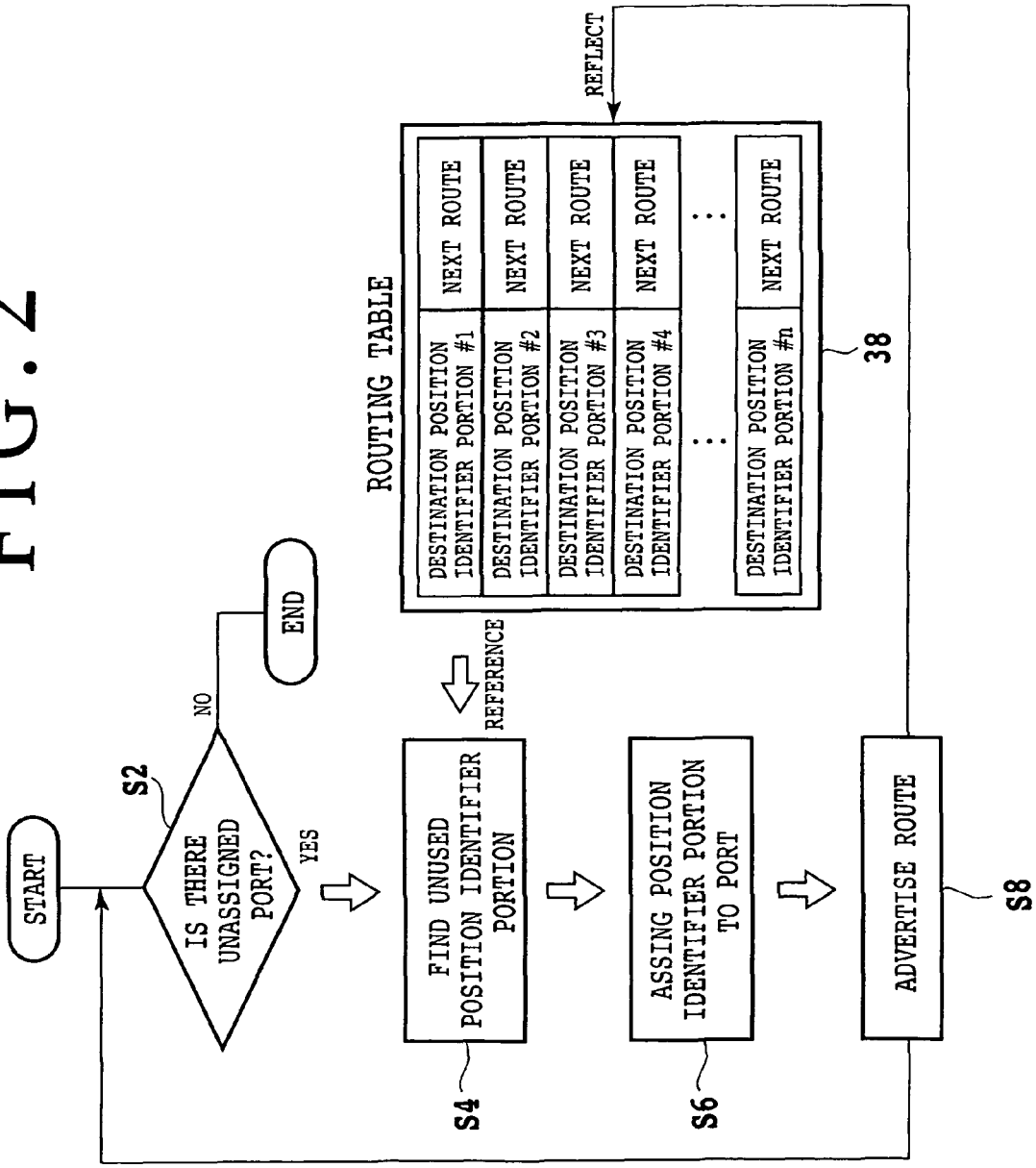
FIG. 2 is a flowchart of assistance in explaining the principles of the present invention.

Principles of the present invention will be described prior to description of an embodiment of the present invention. FIG. 1 is a diagram of assistance in explaining principles of the present invention. FIG. 2 is a flowchart of assistance in explaining the principles of the present invention. As shown in FIG. 1, an IPv6 router 20 has a routing table 30, a determining unit 32, a position identifier portion generating unit 34, a position identifier portion advertising unit 36, and a routing unit 38. At a step S2, the determining unit 32 determines whether there is an unassigned port. When there is an unassigned port, the processing proceeds to a step S4. When there is no unassigned port, the processing is ended. The routing unit 38 receives routing information including a position identifier portion (prefix) according to a dynamic routing protocol, and then registers the routing information in the routing table 30. As shown in FIG. 2, for example, the routing table 30 stores routing information indicating a destination position identifier portion #i (i=1, 2, . . . ) and a next route.

At the step S4, referring to the routing table 30, the position identifier portion generating unit 34 automatically generates an unused position identifier portion for the port 22 not assigned a position identifier portion. At a step S6, the position identifier portion generating unit 34 assigns the generated position identifier portion to the port 22. At a step S8, the routing unit 38 registers the generated position identifier portion and a next route indicating the port 22 in the routing table 30. The position identifier portion advertising unit 36 advertises the position identifier portion from the port 22. Hosts 24#1 and 24#2 receive the advertised position identifier portion, generate an interface identifier portion using a MAC address within the apparatus, and then generate an IPv6 address by combining the position identifier portion and the interface identifier portion with each other. Since the router 20 automatically generates the address, it is possible to readily construct a network even without knowledge of IPv6.

Figure 3:
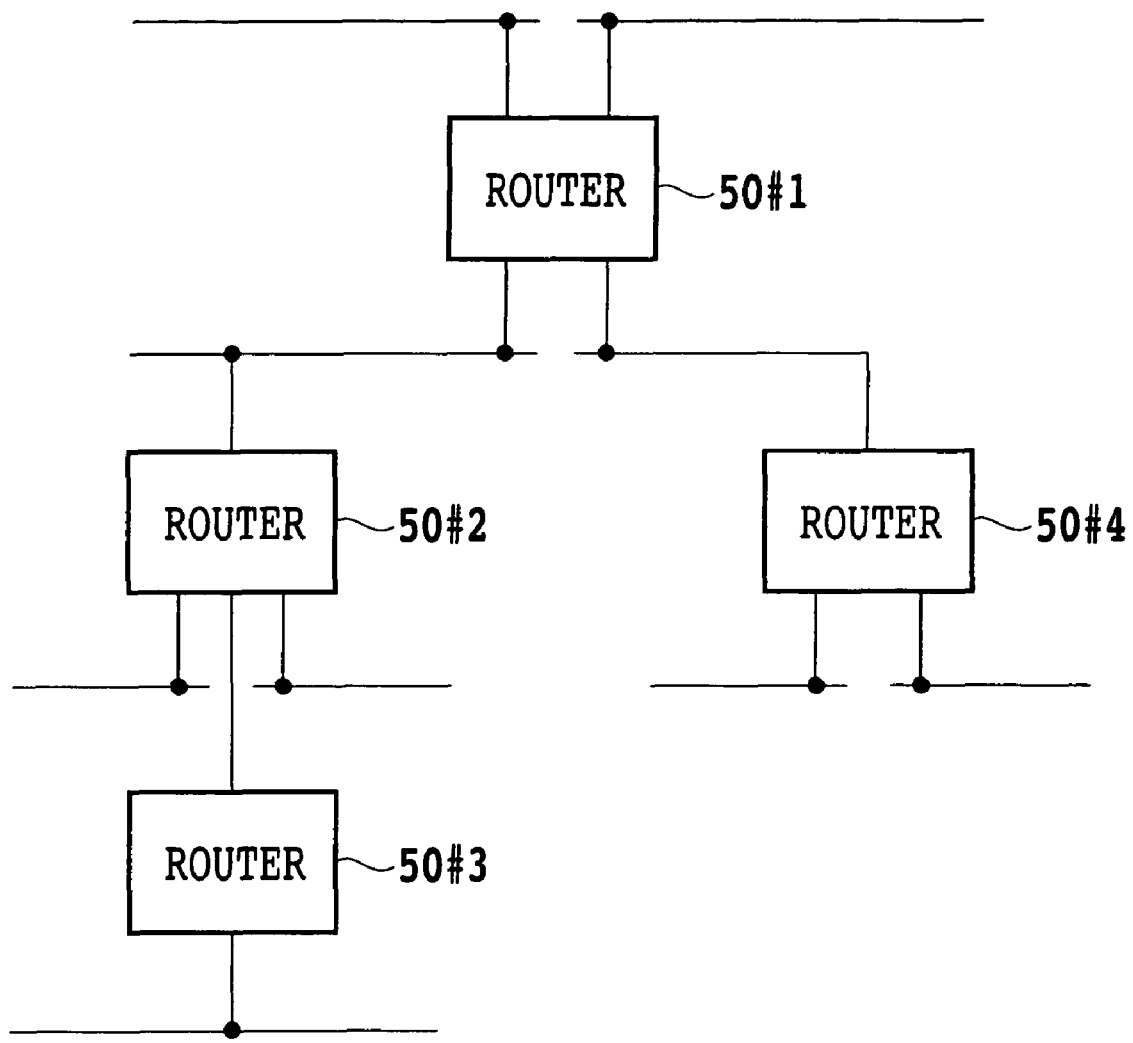
FIG. 3 is a diagram of configuration of a network according to an embodiment of the present invention.

FIG. 3 is a diagram of configuration of a network according to an embodiment of the present invention. As shown in FIG. 3, the network comprises a plurality of routers 50#i (i=1, 2, . . . ) and hosts not shown in the figure accommodated in the network connected to each port of the router 50#i. The network is connected to the Internet via an ISP or the like not shown in the figure. In addition to a function of routing IPv6 packets, the router 50#i has a function of automatically generating an IPv6 address. The host has the following functions. (i) The host receives a prefix advertised from the router 50#i according to a neighbor discovery protocol, and then generates an IPv6 address by combining the prefix with a MAC address within the apparatus. (ii) The host transmits and receives IP packets according to an IPv6 protocol.

Figure 4:
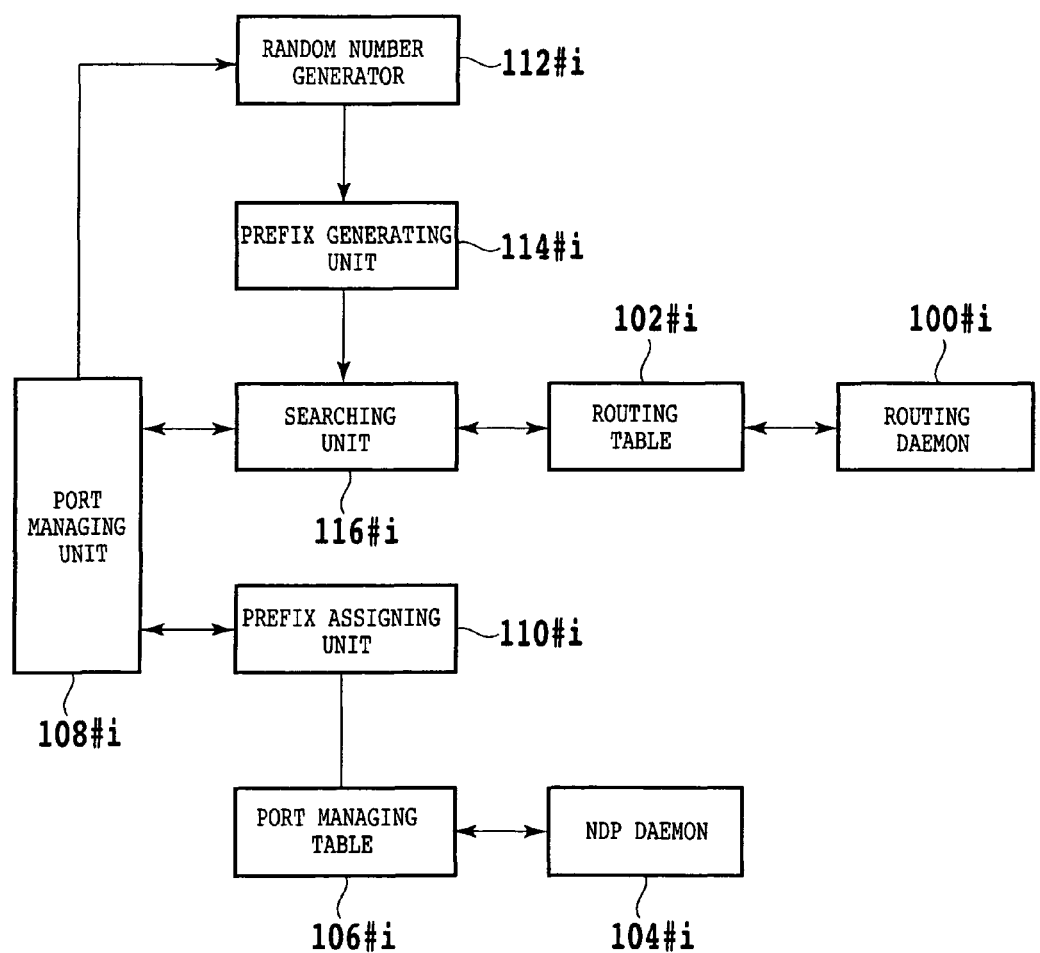
FIG. 4 is a block diagram related to automatic address generation by a router in FIG. 3.

FIG. 4 is a functional block diagram related to the automatic generation of IPv6 addresses by the router 50#i in FIG. 3. As shown in FIG. 4, the router 50#i has a random number generator 112#i, a prefix generating unit 114#i, a searching unit 116#i, a routing daemon 100#i, a routing table 102#i, a prefix assigning unit 110#i, an NDP daemon 104#i, a port managing table 106#i, and a port managing unit 108#i.

The routing daemon 100#i has the following functions. (i) When receiving routing information according to a dynamic routing protocol such as RIP, OSPF or the like, the routing daemon 100#i registers the routing information in the routing table 102#i. For the dynamic routing protocol, RIPng (RFC 2080, "RIPng for IPv6"), OSPF (RFC 2740, "OSPF for IPv6"), IS-IS ("draft-ietf-isis-ipv6-02.txt"), BGP or the like can be used. (ii) The routing daemon 100#i registers in the routing table 102#i routing information indicating a prefix number assigned by the prefix assigning unit 110#i and a corresponding port as a next route.

The routing table 102#i includes prefix numbers and corresponding port numbers indicating next routes. A prefix number is a 64-bit prefix of a site-local address or an aggregatable unicast global address. A next route refers to a port to which an IPv6 packet having the prefix number as destination is routed.

The NDP daemon 104#i has the following functions. (i) When receiving a prefix advertised according to the neighbor discovery protocol from a port, the NDP daemon 104#i stores the port number and the prefix number in the port managing table 106#i. This is for the purpose of determining whether the port is assigned a prefix number, because another router connected to the port may automatically generate the prefix. (ii) When a prefix is generated, the NDP daemon 104#i stores the port number and the prefix number in the port managing table 106#i, and advertises the prefix according to the neighbor discovery protocol.

For each port of the router 50#i, when the port is already assigned a prefix number, the port managing table 106#i stores the corresponding prefix number, and when the port is not yet assigned a prefix number, the port managing table 106#i stores information to that effect. The port managing unit 108#i has the following functions. (i) The port managing unit 108#i inquires of the prefix assigning unit 110#i about whether automatic generation of a prefix is necessary for each port. (ii) When the prefix generation is necessary, the port managing unit 108#i instructs the random number generator 112#i to generate a random number. (iii) When the searching unit 116#i notifies the port managing unit 108#i that there is no prefix matching a generated prefix, the port managing unit 108#i instructs the prefix assigning unit 110#i and the routing daemon 100#i to register the prefix. (iv) When the searching unit 116#*i* notifies the port managing unit 108#*i* that there is a prefix matching the generated prefix, the port managing unit 108#*i* instructs the random number generator 112#*i* to generate a random number again.

The random number generator 112#*i* generates a 16-bit random number. The prefix generating unit 114#*i* generates a prefix by combining the random number generated by the random number generator 112#*i* with a 48-bit fixed value for a site-local address or a 48-bit value set manually, for example, for an aggregatable unicast global address. The searching unit 116#*i* determines whether a prefix number matching the prefix generated by the prefix generating unit 114#*i* is registered in the routing table 102#*i*, and then notifies the port managing unit 108#*i* of information indicating a result of the determination.

The automatic prefix generation will be described in the following. The description in the following will be made of operation of the router 50#1 in FIG. 3.

(a) Case of Site-Local Address (1) Generation of Routing Table 102#1

When the routing daemon 100#1 receives routing information from each port, the routing daemon 100#1 registers a prefix number included in the routing information and the number of the port receiving the routing information as a next route in the routing table 102#1, and advertises the routing information from other ports. Further, the routing daemon 100#1 registers a prefix number generated for a port by the router 50#1 and the port number in the routing table 102#1, and advertises the routing information from the other ports.

(2) Generation of Port Managing Table 106#1

When the NDP daemon 104#1 receives a prefix number advertised according to the neighbor discovery protocol from a port, the NDP daemon 104#1 registers the prefix number for the port in the port managing table 106#1. Also, the prefix assigning unit 110#1 registers a prefix number and a port number for a port generated by the router 50#1 in the port managing table 106#1.

(3) Automatic Prefix Generation

Figure 5:
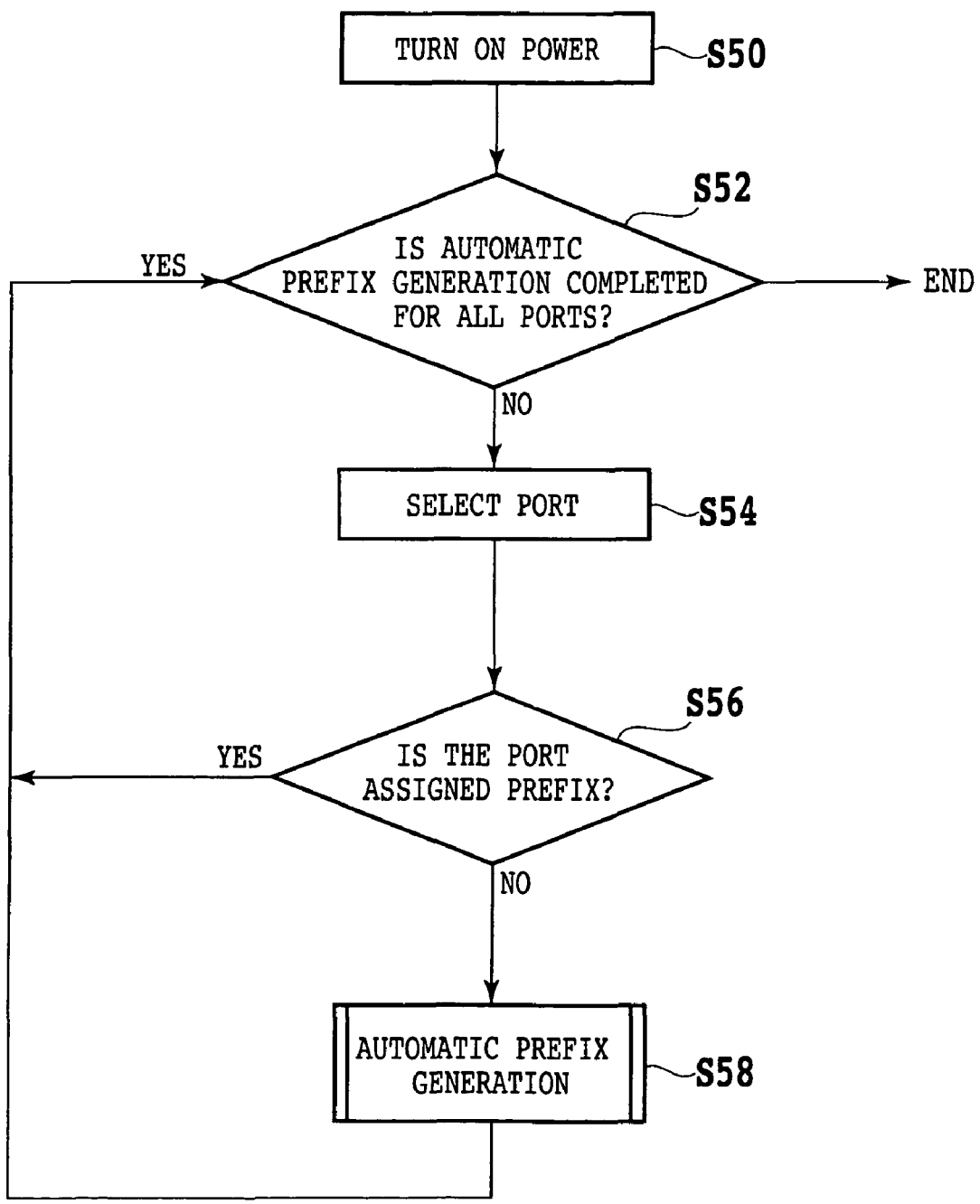
FIG. 5 is a flowchart of automatic generation of a site-local address.
Figure 6:
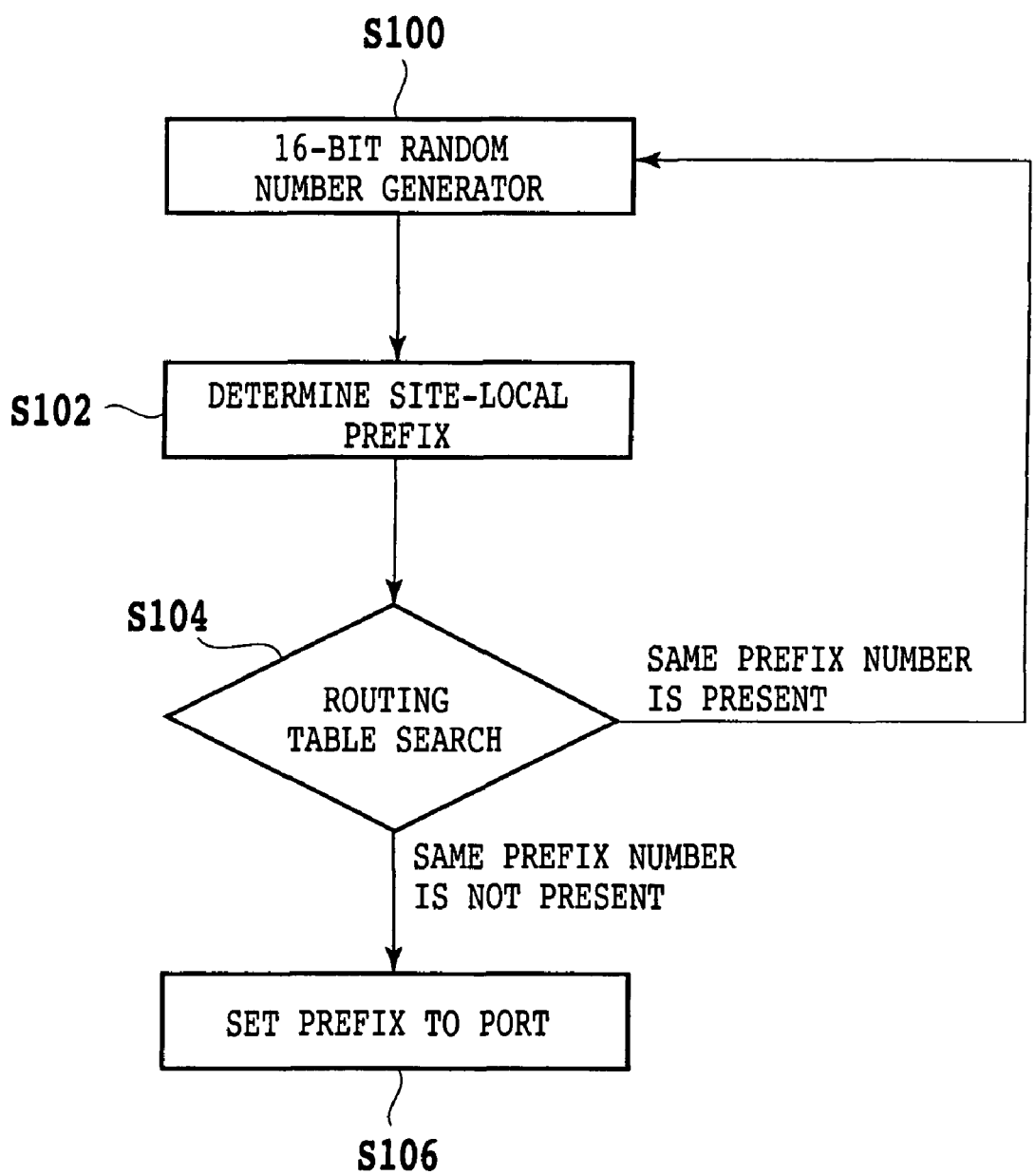
FIG. 6 is a flowchart of automatic generation of a site-local address.

FIG. 5 and FIG. 6 are flowcharts of automatic generation of a site-local address. At a step S50, power to the router 50#1 is turned on. At a step S52, whether automatic prefix generation is completed is determined for all ports. When the prefix generation is completed for all the ports, the processing is ended. When the automatic prefix generation is not completed for all the ports, the processing proceeds to a step S54. At the step S54, a port is selected. At a step S56, the prefix assigning unit 110#1 refers to the port managing table 106#1 to determine whether the port is assigned a prefix. When the port is not assigned a prefix, the processing proceeds to a step S58. When the port is assigned a prefix, the processing returns to the step S52. At a step S58, automatic prefix generation as described below is performed.

At a step S100 in FIG. 6, the random number generator 112#1 generates a 16-bit random number as a candidate for a subnet ID. At a step S102, the prefix generating unit 114#1 combines a 48-bit fixed value of site-local addresses with the 16-bit random number, and thereby generates a prefix. At a step S104, the searching unit 116#1 searches the routing table 102#1 to determine whether the same prefix number as that of the generated prefix is present in the routing table 102#1. When the same prefix number as that of the generated prefix is present in the routing table 102#1, the processing returns to the step S100. When the same prefix number as that of the generated prefix is not present in the routing table 102#1, the processing proceeds to a step S106. At the step S106, the prefix assigning unit 110#1 registers the prefix number for the port in the port managing table 106#1.

(4) Advertisement of Prefix

The NDP daemon 104#1 advertises the site-local address prefix number generated for the port, from the port according to the neighbor discovery protocol. A host connected to the port generates an IPv6 address of the host by combining the prefix number advertised according to the neighbor discovery protocol with a MAC address within the host.

(b) Case of Aggregatable Unicast Global Address

Figure 7:
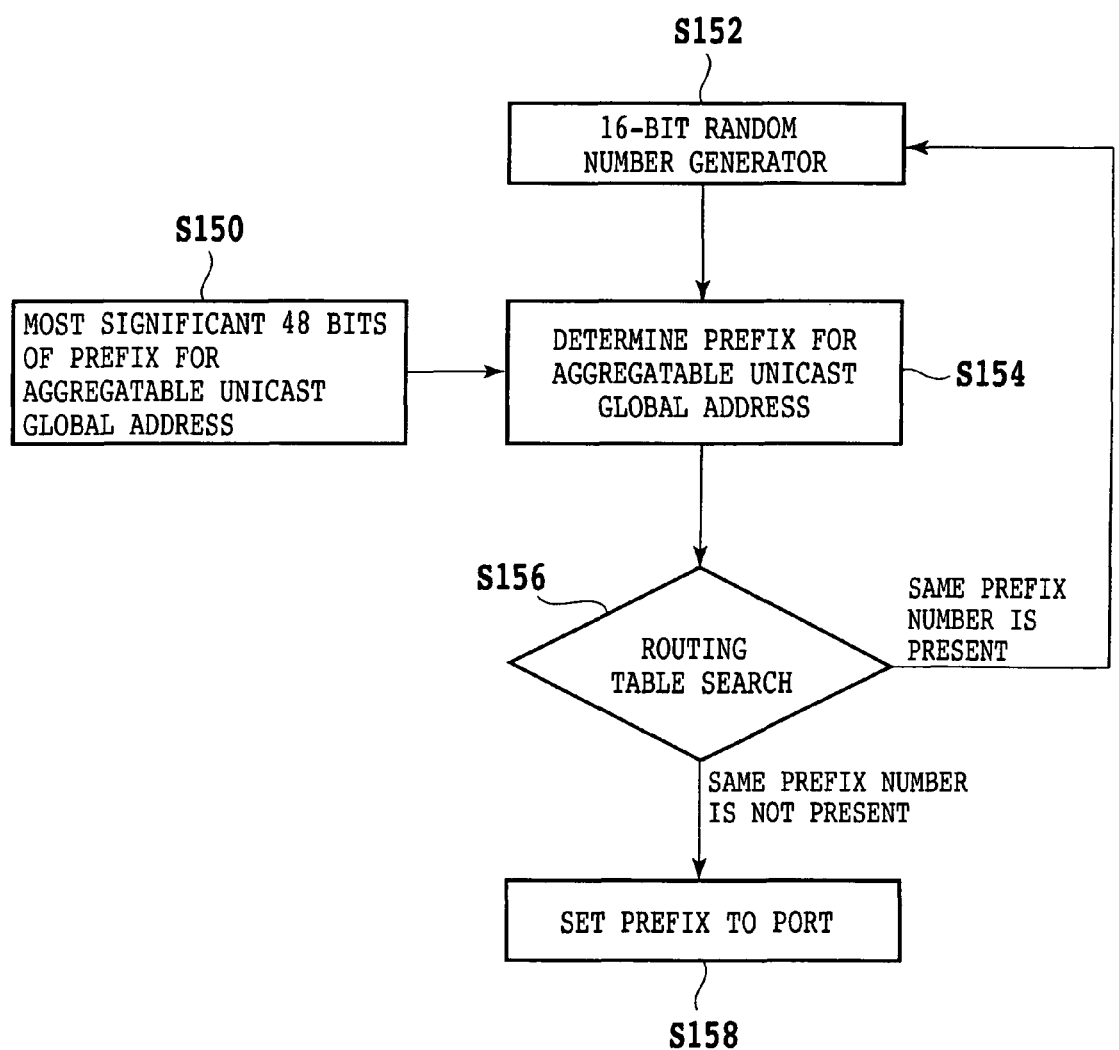
FIG. 7 is a flowchart of automatic generation of an aggregatable unicast global address.
Figure 8:
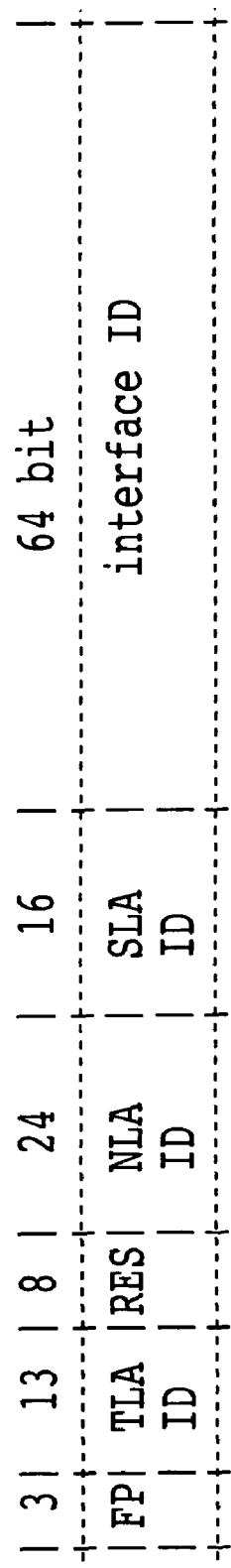
FIG. 8 is a diagram showing an aggregatable unicast global address.
Figure 9:
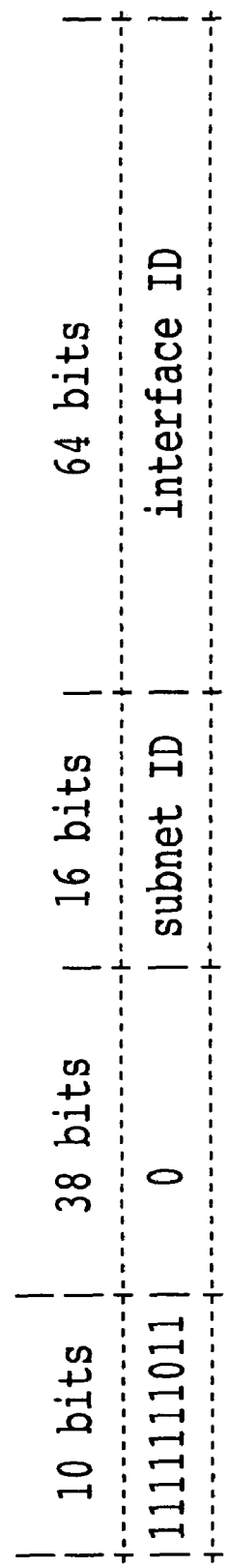
FIG. 9 is a diagram showing a site-local address.

FIG. 7 is a flowchart of automatic generation of an aggregatable unicast global address. A flow in the case of the aggregatable unicast global address is the same as in the case of the site-local address in FIG. 5. At a step S150 in FIG. 7, the most significant 48 bits of a prefix of the aggregatable unicast global address is inputted. At a step S152, the random number generator 112#1 generates a 16-bit random number as a candidate for an SLA ID. At a step S154, the prefix generating unit 114#1 combines the most significant 48 bits of the aggregatable unicast global address with the 16-bit random number, and thereby sets the 64-bit prefix of the aggregatable unicast address.

At a step S156, the searching unit 116#1 searches the routing table 102#1 to determine whether the same prefix number as that of the generated site-local prefix is present in the routing table 102#1. When the same prefix number as that of the generated prefix is present in the routing table 102#1, the processing returns to the step S152. When the same prefix number as that of the generated prefix is not present in the routing table 102#1, the processing proceeds to a step S158. At the step S158, the prefix assigning unit 110#1 registers the site-local prefix number for the port in the port managing table 106#1.

(1) While in the present embodiment, description has been made of an example of generating a prefix with a random number, it is possible to generate a prefix by other methods. For example, a prefix is generated by incrementing a maximum value among prefixes having a fixed value as the most significant 48 bits of the prefix values registered in the routing table 102#*i* in the case of site-local addresses or having the same most significant 48 bits inputted manually in the case of aggregatable unicast global addresses.

(2) Automatic prefix generation may result in the same prefix being generated in different networks by different routers. In such a case, since it is found at a time of updating the routing table 102#*i* that the prefix number generated by the router 50#*i* is the same as the prefix number generated by the other router, an operator is notified to reset the prefix number manually, or one prefix number is updated to a different prefix number through coordination between the routers, whereby the presence of the identical prefixes can be avoided.

The present embodiment described above requires no setting for site-local addresses, and therefore even a person without knowledge of IPv6 can construct an IPv6 network. Further, while the setting of the most significant 48 bits is required for aggregatable unicast global addresses, it suffices to perform the same setting on all routers used within the network. This obviates the need for designing a unique address and setting the address, thus eliminating trouble and facilitating network design. Further, since addresses are generated on the basis of information of a network actually constructed, it is possible to avoid mistakes in design and mistakes in setting, avoid accidents, and eliminate the need for centralized management work conventionally essential for uniqueness of addresses, or the manager.

As described above, the present invention makes it possible to construct an IPv6 network without difficult setting, and thus greatly contributes to the development of the Internet to which home information appliances within households are connected.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A router for automatically generating an IP address comprising a position identifier portion and an interface identifier portion, said router comprising:
   a routing table for storing each position identifier portion and information on an output route for the position identifier portion;
   a determining unit for determining for each of a plurality of ports whether a position identifier portion is assigned to a network to which the port is connected;
   a position identifier portion generating unit for referring to said routing table and generating a position identifier portion different from the position identifier portion registered in said routing table for a port not assigned a position identifier portion;
   a routing unit for receiving routing information including a position identifier portion according to a dynamic routing protocol and registering the routing information in said routing table, and registering routing information including the position identifier portion generated by said position identifier portion generating unit in said routing table and notifying another router of the routing information; and
   a position identifier portion advertising unit for advertising the generated position identifier portion from the port,
   wherein said IP address is an IPv6 aggregatable unicast global address; and
   said position identifier portion generating unit generates an SLA value of least significant 16 bits different from SLA values of least significant 16 bits of all position identifier portions registered in said routing table, said position identifier portions having most significant 48 bits identical with most significant 48 bits assigned to the router, and generates said position identifier portion by combining the SLA value with the most significant 48 bits.

2. A router for automatically generating an IP address comprising a position identifier portion and an interface identifier portion, said router comprising:
   a routing table for storing each position identifier portion and information on an output route for the position identifier portion;
   a determining unit for determining for each of a plurality of ports whether a position identifier portion is assigned to a network to which the port is connected;
   a position identifier portion generating unit for referring to said routing table and generating a position identifier portion different from the position identifier portion registered in said routing table for a port not assigned a position identifier portion;
   a routing unit for receiving routing information including a position identifier portion according to a dynamic routing protocol and registering the routing information in said routing table, and registering routing information including the position identifier portion generated by said position identifier portion generating unit in said routing table and notifying another router of the routing information; and
   a position identifier portion advertising unit for advertising the generated position identifier portion from the port,
   wherein said IP address is an IPv6 site-local address; and
   said position identifier portion generating unit generates a subnet ID of least significant 16 bits different from subnet IDs of least significant 16 bits of all position identifier portions registered in said routing table, said position identifier portions having most significant 48 bits identical with most significant 48 bits set fixedly, and generates said position identifier portion by combining the subnet ID with the most significant 48 bits.

* * * * *